United States Patent [19]

Dimeff

[11] Patent Number: 4,776,208
[45] Date of Patent: Oct. 11, 1988

[54] CAPILLARY FLOW CONTROLLER FOR AIR PRESSURIZED TELEPHONE CABLE TRACE GAS

[75] Inventor: John Dimeff, San Jose, Calif.

[73] Assignee: Mark Telephone Products, Santa Clara, Calif.

[21] Appl. No.: 41,801

[22] Filed: Apr. 23, 1987

[51] Int. Cl.$^4$ ............................................. G01M 3/20
[52] U.S. Cl. ...................................................... 73/40.7
[58] Field of Search ................................... 73/40.7, 40

[56] References Cited

U.S. PATENT DOCUMENTS

| | | | |
|---|---|---|---|
| 2,518,327 | 8/1950 | Jahn | 73/40.7 |
| 3,032,655 | 5/1962 | Romans | 73/40.7 |
| 3,060,725 | 10/1962 | Bernard | 73/40.7 |
| 3,085,423 | 4/1963 | Champion | 73/40.7 |
| 3,106,089 | 8/1963 | Scott et al. | 73/40.7 |
| 4,189,938 | 2/1980 | Heim | 73/40.7 |
| 4,445,364 | 5/1984 | Stieff et al. | 73/40.7 |
| 4,551,154 | 11/1985 | Malcosky et al. | 73/40.7 |
| 4,648,260 | 3/1987 | Zuckerman | 73/27 R |

Primary Examiner—Stewart J. Levy
Assistant Examiner—Hezron E. Williams
Attorney, Agent, or Firm—Townsend and Townsend

[57] ABSTRACT

An improvement in the test for air leaks of an air pressurized telephone cable is disclosed. The cable is of the type wherein a number of individually insulated conducting electrical strands are surrounded by a protective plastic tubing impermeable to water and maintained dry under air pressure. The cable is typically buried. The improvement comprises a capillary flow controller for the introduction of trace gas, such as helium into the cable. The trace gas is introduced into the system at a pressure exceeding twice and preferably 10 times the ambient dry air pressure within the cable. The capillary introduces the high pressure trace gas to the interior of the cable by leaking a relatively constant volume flow rate to a discharge chamber. The discharge chamber includes a pressure relief valve—to guard against cable sheath rupture in the case of local occlusion, a pressure gauge—to measure the pressure of the line at the point of helium introduction, and a discharge aperture—which is the point of introduction of the trace gas into the air pressurized cable. Trace gas enters into the system through the capillary at a constant rate which can from time to time be monitored with conventional flow rate equipment.

5 Claims, 3 Drawing Sheets

CAPILLARY FLOW CONTROLLER FOR AIR PRESSURIZED TELEPHONE CABLE TRACE GAS

BACKGROUND OF THE INVENTION

This invention relates to the testing of air pressurized telephone cables. More specifically, a flow controller is disclosed wherein trace gas under large pressure is introduced through a capillary at a substantially constant volume rate into buried air pressurized telephone cable to be tested for leaks.

STATEMENT OF THE PROBLEM

Telephone cable is typically covered with a substantially air impermeable sheath—typically made from plastic—and buried in the ground. In order to prevent moisture from entering the cable, dry air systems are used to keep the cable dry. These systems force dry air into the cable in the interstitial volume between the conducting strands and the surrounding sheath. As a result of aging, abuse and continual modification, the sheath systems begin to leak. Because the cable resists air flow, excessive air leakage causes the air pressure in the cable to drop below the minimum level required for protection from moisture.

Current practice for the detection of leaks in air pressurized cable systems includes introducing a trace gas—such as helium—locally into the air pressurization system. Typically, a gas connection is made at a pressure panel appropriately manifolded for the introduction of trace gas. This panel is usually located at a central office or remote air manifold in a manhole. The trace gas is introduced from a gas cylinder through a pressure reduction valve at an operator selected pressure slightly exceeding that of the local air pressure within the sheaved cable. For example, if the local air pressure within the cable is in the range of 10 lbs., it is the usual practice to cause the introduction of trace gas (helium) at a pressure of about 12.5 lbs. Unfortunately, such pressure introduction techniques have not been without difficulty.

It will be remembered that where an air pressurized telephone cable has developed leaks, the local flow rates and local pressures are by definition unknown. The problems that such unknown fluid dynamics can cause can be set forth by considering two commonly encountered situations.

In some cases, in order to appropriately saturate a gas pressurized cable for test, a bottle of helium is connected across a pressure regulator through a manifold. Helium is introduced into the cable for tests. Typically, the gas bottle is discharged for a relatively long period of time (overnight) in order to saturate the system with trace gas so that a test for leaks may be conducted. However, where a large leak is present, the attached pressure regulator allows all of the trace gas to escape. It is not uncommon for technicians to arrive the next day, find the helium bottle exhausted and have to repeat the trace gas introduction procedure.

In other cases, a gas bottle discharging trace gas through a pressure reduction valve initially inputs trace gas into the system. However, as a result of the additional pressure drops caused by the introduction of flowing helium, back pressures in the system rise above the relatively low over pressure of trace gas introduction. These back pressures prevent the outflow of trace gas and are usually not discovered until substantial time has elapsed. Upon returning to the site of trace gas introduction, operating personnel find that the saturation procedure must be repeated and changed.

SUMMARY OF THE INVENTION

An improvement in the test for air leaks of an air pressurized telephone cable is disclosed. The cable is of the type wherein a number of individually insulated conducting electrical strands are surrounded by a protective plastic tubing impermeable to water and maintained dry under air pressure. The cable is typically buried. The improvement comprises a capillary flow controller for the introduction of trace gas, such as helium into the cable. The trace gas is introduced into the system at a pressure exceeding twice and preferably 10 times the ambient dry air pressure within the cable. The capillary introduces the high pressure trace gas to the interior of the cable by leaking a relatively constant volume flow rate to a discharge chamber. The discharge chamber includes a pressure relief valve—to guard against cable sheath rupture in the case of local occlusion, a pressure gauge—to measure the pressure of the line at the point of helium introduction, and a discharge aperture—which is the point of introduction of the trace gas into the air pressurized cable. Trace gas enters into the system through the capillary at a constant rate which can from time to time be monitored with conventional flow rate equipment. The capillary is selected to provide a flow which is small compared to the total gas flowing through the cable leak (in the order of 10%). The rate of entry is maintained constant with respect to the largely unknown fluid dynamics of the air pressurized cable. This constant rate of entry occurs because the pressure drop across the capillary is large when compared to the variation in pressure caused by the introduction of an added flowing gas. Consequently, prediction of trace gas progress through a sheath telephone cable can be made with more certainty, both with respect to the time of arrival of the introduced trace gas at a suspect leak site and the percentage of trace gas saturation of the system. At the leak site, the trace gas migrates to the surface, is detected, and therefore indicates the optimum site for excavation and repair of the cable.

Other Objects, Features and Advantages

It is an object of this invention to disclose an improvement in the present process for testing buried air pressurized telephone cable for leaks. The process improved includes introducing helium, a trace gas, under pressure into an air pressurized cable system for a predetermined period of time. Thereafter, the intermixed air and helium are allowed to leak through the cable sidewalls. When the leak occurs, helium detectors are utilized to locate the site of the leak. Excavation and repair of the cable then occurs.

The improvement includes introducing the helium at a pressure that exceeds at least twice the pressure of the ambient pressurizing air in the cable and preferably is in the order of 10 times the pressure of the ambient pressurizing air in the cable. The helium is introduced through a capillary so that the helium pressure drop occurs across the capillary. The helium passing through the capillary is allowed to mix with the pressurizing gas without substantially altering pressure within the telephone cable. Introduction of trace gas at a substantially constant volume flow rate per unit time occurs.

An advantage of the disclosed process is that the constant volume introduction of trace gas can be conveniently controlled to be a small fraction (say 10) of the total gas flow in the air pressurized cable. This small fraction of gas flow does not disturb appreciably the unknown fluid dynamics of the leaking air pressurized telephone cable. Consequently, the air pressurization system remains substantially undisturbed during its test for leaks.

A further advantage of the disclosed process is that where a large leak is present and even local to the point of trace gas introduction, the helium bottle evacuates at a constant and predictable rate. Consequently, operating personnel can leave a discharging bottle of trace gas without danger of a conventional pressure regulator emptying the contents of the bottle.

A further advantage of the disclosed controller is that even if the local aack pressures of the system at the point of trace gas introduction change. the constant volume introduction of helium still occurs. Small and local changes in pressure are immediately overcome by a corresponding pressure rise at the capillary discharge. These local changes in pressure constitute a small fraction of the trace gas pressure drop through the manifold. Consequently, the changes in pressure do not appreciably interfere with the constant volume of trace gas flowing across the capillary.

A further object of this invention is to disclose a trace gas apparatus for tests. According to this aspect of the invention, a capillary protected by a filter discharges trace gas. The trace gas is introduced at relatively high pressure at the high pressure side of the filter and discharges into the high pressure side of the capillary. The trace gas equilibrates through the capillary into the discharge chamber at the low pressure side of the capillary tube. A connected pressure gauge at the discharge chamber and a pressure relief valve at the discharge chamber assure that trace gas discharge will not rupture the cable sheath. At the same time, trace gas is discharged in a constant rate of flow into the air pressurized cable.

An advantage of the capillary is that flow rate of the trace gas can be relatively accurately predicted through the capillary. This feature becomes more important when it is remembered that most flow meters are calibrated for air, and not the lighter trace gas, such as helium. Hence, the capillary and the pressure across the capillary can provide a more reliable indication of flow rate.

A further advantage of this capillary flow controller is that it can be adapted to already existent field equipment.

BRIEF DESCRIPTION OF THE DRAWINGS

Other objects, features and advantages will become more apparent after referring to the following specification and attached drawings in which.

DESCRIPTION OF THE PREFERRED EMBODIMENT

Figure 1:
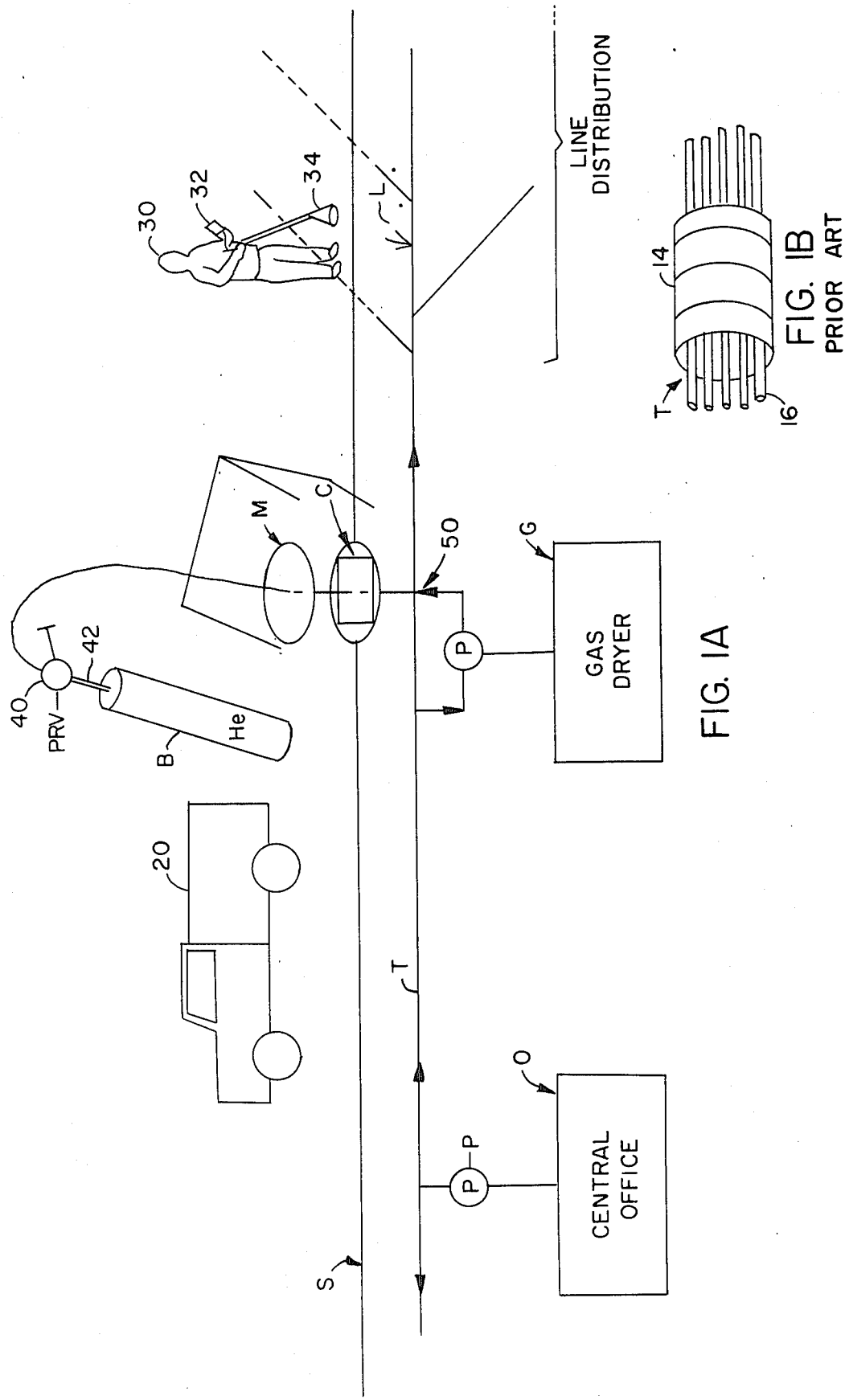
FIG. 1A is a schematic diagram illustrating a buried air pressurized telephone cable system illustrating the use of the invention disclosed herein.
FIG. 1B is a prior art illustrating a moisture sheath surrounding a plurality of connectors.

Referring to FIG. 1A a buried table cable T is shown under a street S. The cable originates at a central telephone office O. Pressurized air from pump P fills the cable. The function of this pressurizing air can be understood with respect to FIG. 1B.

Specifically, the cable T includes an air sheath and moisture barrier sheath 14 surrounding a plurality of individual strand conductors 16, these conductors often numbering in the hundreds. Sheath 14 is typically a plastic material such as polyvinyl chloride. In order to maintain the conductors 16 dry as cable T is buried underground in street S, air pressure is introduced into the interstices within the sheath 14 and around and about the individual strand conductor 16.

Such an air pressurized system anticipates that some air will be lost. The lost air opposes inflowing and ambient hydraulic pressure of water and moisture under the street which might penetrate cable T through sheath 14 thereby potentially causing shorting of one of the conductors 16 to its neighboring conductors 16. Consequently, the telephone transmission of strand conductors 16 is protected. Additionally, the dry air flowing through the cable T within sheath 14 between strand conductors 16 serves a drying function, the individual strand conductors 16 are maintained in a dry state by moisture evaporation into and entrainment by the dry pressurized air.

Referring back to FIG. 1A, cable T is shown passing in the vicinity of a manhole M. A telephone repair truck 20 at the site of manhole M has connected a helium bottle B to a manifold 50 within manhole M. The manifold 50 here happens to include a so-called gas dryer station G for removing drying and recharging cable T with dry gases. A telephone repair person 30 is shown with a helium detector 32. The helium detector operates through a funnel shaped collector 34.

For purposes of illustration, telephone cable T has been illustrated with a leak L. As in the prior art systems, leak L will discharge both the ambient air and the introduced trace gas from bottle B. The trace gas will percolate to the surface of the street S where it will be collected at funnel 34 and analyzed at meter 32 identifying to the operator 30 the site of the leak L. Thereafter, excavation will occur and leak L will be repaired.

It will be understood that helium within bottle B is normally at pressures exceeding a 1,000 psi. In order to discharge helium, a pressure reducing valve 40 is connected to bottle B at outlet 42. Gas flows into a manifold 50 within manhole M.

Figure 2:
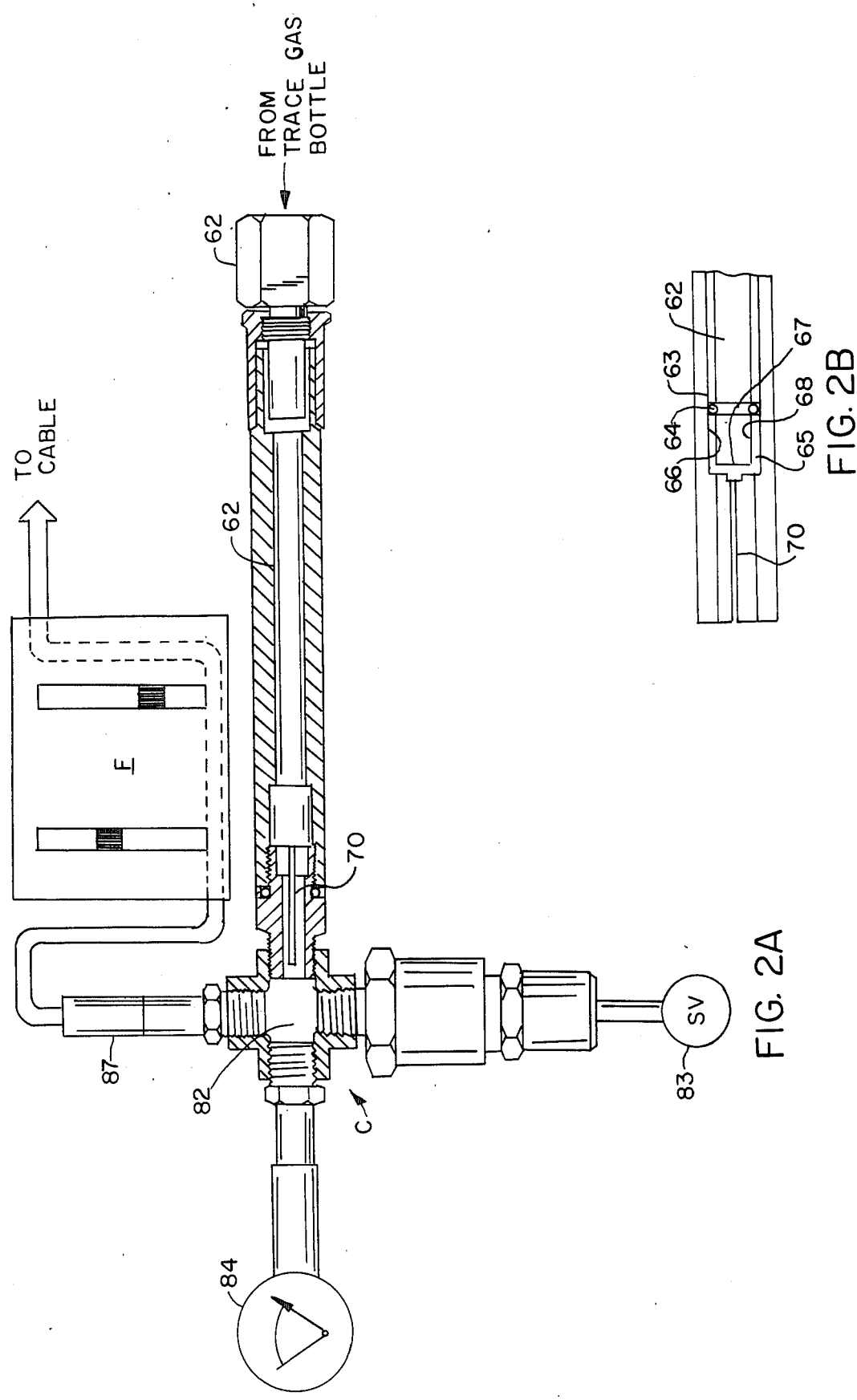
FIG. 2A is a detail of the flow controller constituting the improvement in the process and apparatus of this invention.
FIG. 2B is a detail construction of the capillary tube.

The improvement in the disclosed invention constitutes the capillary flow controller C installed between the outlet of the pressure reduction valve 40 and the inlet at manifold 50 to the telephone cable T. This improved apparatus can best be observed at FIG. 2.

Referring to FIG. 2A, the capillary flow controller C is illustrated in detail. Typically, an air fitting 60 accepts helium from pressure reducing valve 40 on bottle B. Helium passes into tubing 62 and then through a capillary tube 70 into a discharge chamber 82.

The construction of the capillary tube 70 can best be seen with respect to FIG. 2B. Specifically, tube 62 terminates at end 63 to O ring 64. O ring 64 traps a cup shaped filter 65 within a cup shaped indentation 66. The function of cup indentation 66 is to keep the filter away from the capillary entrance to maintain flow through the cup shaped filter 65 into the capillary 70.

Cup shaped filter 65 is open adjacent O ring 64. Helium is therefore free to flow through both the end wall 67 as well as the sidewall 68 of cup shaped filter 65. Gases so flowing find their entrance into the capillary 70. Typically, pressure of the helium in tube 62 is maintained at least twice the pressure of the ambient air within the telephone cable T. Preferably, the pressure can be 10 times as high as air pressure within cable T.

Normally, such high trace gas pressure if directly introduced into a telephone cable sheath would cause the cable sidewalls to burst. Here, however, because of the pressure drop and constant flow rate through capillary 70, such bursting does not occur.

Returning to FIG. 2A, capillary 70 discharges into a discharge chamber 82. Discharge chamber 82 is preferably connected to a safety valve 83 to discharge pressures in excess of those that could rupture the cable sheath. At the same time, a pressure valve 84 may be attached to discharge chamber 82 to monitor the actual pressure at the discharge chamber.

Safety valve 83 has a specific purpose. On occasion, points of trace gas introduction are immediately occluded. If such an immediate occlusion occurs, pressure relief is provided at once by valve 83.

Discharge chamber 82 exhausts through an outlet 87 to the cable. As illustrated here, optionally a flow meter F is connected between the discharge 87 and the air connection to the cable at 50 in manifold M (see FIG. 1A).

The reader will understand that the disclosed capillary flow controller introduces trace gas into the system at a substantially constant flow rate. This flow rate remains relatively constant despite wide fluctuations in pressure within the telephone cable T.

In normal air pressurization systems, air passes into the system under pressure at roughly predictable flow rate, Using this roughly predictable flow rate. operating personnel estimate the time required to saturate air with trace gas within a section of the cable to be tested. When this predictable saturation of a section for test is realized, tests for leaks may proceed.

The reader may therefore understand the improvement of the present apparatus and process. Clearly if trace gas introduction disturbs the fluid dynamics of the cable to the extent that ambient flow rates are disturbed, saturation of the system with trace gas becomes less predictable.

Telephone cables are usually pressurized in the range of 10 lbs. Pressures can range interior of the cable in a usual range from a high range of 12 lbs. per square inch to an approximate low range of 4 lbs. per square inch.

Dependent upon the desired standard cubic feet per hour of trace gas to be introduced, both capillary length and diameter can be changed. Experimental testing of such a capillary flow has yielded the following results:

| HELIUM FLOW THROUGH CAPILLARY | | | | | |
|---|---|---|---|---|---|
| TUBING (INCH) | | PRESSURES (PSI GAUGE) | | FLOW (SCFH) | |
| LENGTH | ID | $P_1$ | $P_2$ | MEAS'D | CALC |
| 1.8 | .010 | 120 | 4 | 14.54 | 14.54 |
|  | ⊙ | 120 | 12 | 11.31 | 10.85 |

| HELIUM FLOW THROUGH CAPILLARY -continued | | | | | |
|---|---|---|---|---|---|
| TUBING (INCH) | | PRESSURES (PSI GAUGE) | | FLOW (SCFH) | |
| LENGTH | ID | $P_1$ | $P_2$ | MEAS'D | CALC |
|  |  | 60 | 4 | 8.88 | 8.91 |
|  |  | 60 | 12 | 6.19 | 6.51 |
| 1.2 | .010 | 120 | 4 | 19.38 | 19.37 |
|  | ▫ | 120 | 12 | 15.48 | 14.45 |
|  |  | 60 | 4 | 12.65 | 11.87 |
|  |  | 60 | 12 | 10.09 | 8.67 |
| 1.8 | .006 | 120 | 4 | 3.0 | 2.79 |
|  | △ | 120 | 12 | 2.02 | 2.08 |
| 0.6 | .006 | 120 | 4 | 1.8 | 1.71 |
|  | ▽ | 120 | 12 | 1.0 | 1.25 |
|  |  | 60 | 4 | 1.20 | 1.28 |
|  |  | 60 | 12 | .95 | .96 |

The above data has been utilized to generate an empirical equation for the volume of flow V. The equation is:

$$V = 1.91 \times 10^5 \left( \frac{P\Delta P}{P_{EXIT}^2} \right)^{.4} \frac{D^{4.75}}{L^{.707}} \ S.C.F.H.$$

$$P = \frac{P_1 + P_2}{2} + 14.7 \quad D = I.D., INCH$$

$$\Delta P = P_1 - P_2 \quad L = LENGTH, INCH$$

$$P_{EXIT} = P_2 + 14.7$$

Figure 3:
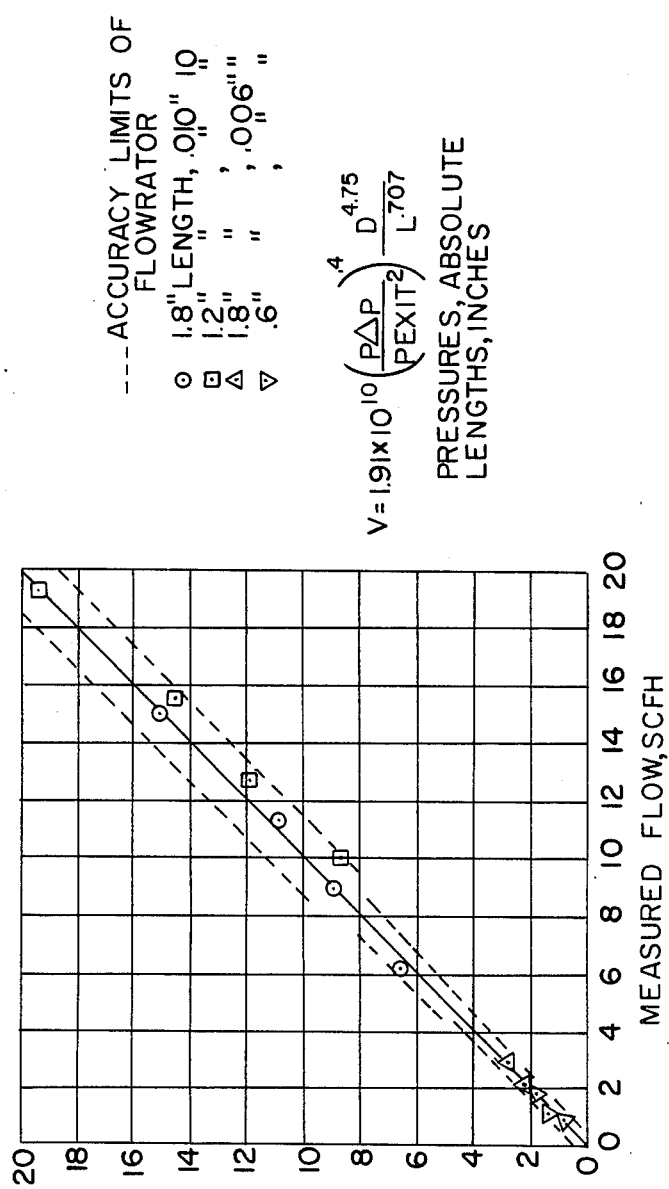
FIG. 3 is a graph illustrating the flow through various sizes and lengths of capillary tubes utilized with this invention.

It has been determined that calculated flow utilizing the above derived equation corresponds closely with measured flow. Specifically, attention is directed to the plot of FIG. 3.

It can be seen by the foregoing that the invention herein disclosed can have capillaries substituted to fit the particular flow rates required for an appropriate trace gas test. Further, gas pressure drop across the same capillary can be grossly varied to produce corresponding gross changes in flow rate.

In practice, introducing a trace gas having a flow rate in the order of 10% the estimated flow rate of gas within a telephone cable T is preferred. Such a level of trace gas enables detection of leaks having serious effect on the pressurization of telephone cable.

What is claimed is:

1. The improvement in the process for testing buried air pressurized telephone cable for leaks wherein the process has the steps of introducing trace gas within air pressurized telephone cable, said trace gas being introduced for a predetermined period of time; allowing said trace gas to leak from said cable with air leaking from said cable; and detecting said trace gas as said trace gas leaks with said air through the sheath of said cable, the improvement in said introducing step comprising;
    introducing said trace gas at a pressure exceeding at least twice the pressure of ambient air in said gas pressurization system;
    providing a capillary connection between said introduced trace gas and said air pressurized telephone cable; and
    allowing said introduced trace gas to flow through said capillary to said air pressurized telephone cable whereby said trace gas enters said air pressurized telephone at a substantially constant volume per unit of time.

2. The invention of claim 1 and wherein said introducing said trace gas step includes introducing said trace gas at a pressure at least 10 times the pressure of ambient air in said gas pressurized telephone cable.

3. The process of claim 1 and wherein said providing a capillary step includes the step of providing a capillary having a diameter from the range of 0.030 to 0.003 inches.

4. In an apparatus for testing an air pressurized telephone cable for leaks, said apparatus including a bottle of helium under high pressure, a pressure reduction valve for reducing the pressure of said helium for introduction into an air pressurized cable to mix the air within said cable with helium for test, and a conduit for passing said trace gas into said pressurized telephone cable, the improvement comprising a capillary tube between said discharge from said pressure regulator and said point of introduction into said pressurized telephone cable, said capillary tube having a diameter in the range of 0.030 to 0.003 inches.

5. The apparatus of claim 4 and wherein said capillary tube discharges to a discharge chamber,
   said discharge chamber communicates to said pressurized telephone cable;
   a safety valve for relieving excess pressure in said discharge chamber:
   said safety valve communicated to said discharge chamber to prevent rupture of said pressurized telephone cable.

* * * * *